(12) United States Patent
Palazzolo et al.

(10) Patent No.: US 7,299,706 B2
(45) Date of Patent: Nov. 27, 2007

(54) FLOW METER AND METHOD OF USING THE SAME

(75) Inventors: Frank Palazzolo, Sterling Heights, MI (US); Murad M. Ismailov, Holt, MI (US)

(73) Assignee: Michigan Custom Machines, Inc., Farmington Hills, MI (US)

( * ) Notice: Subject to any disclaimer, the term of this patent is extended or adjusted under 35 U.S.C. 154(b) by 0 days.

(21) Appl. No.: 11/347,913

(22) Filed: Feb. 6, 2006
(Under 37 CFR 1.47)

(65) Prior Publication Data

US 2007/0022826 A1     Feb. 1, 2007

Related U.S. Application Data

(60) Provisional application No. 60/650,347, filed on Feb. 4, 2005, provisional application No. 60/764,224, filed on Feb. 1, 2006.

(51) Int. Cl.
*G01F 1/34* (2006.01)
*F02M 65/00* (2006.01)

(52) U.S. Cl. ............................ 73/861.42; 73/119 A

(58) Field of Classification Search .................. None
See application file for complete search history.

(56) References Cited

U.S. PATENT DOCUMENTS 5,186,008 A * 2/1993 Appolonia et al. ............. 62/63
5,663,509 A * 9/1997 Lew et al. ............... 73/861.357
5,700,958 A * 12/1997 Lew et al. ............... 73/861.357
2006/0173607 A1 * 8/2006 Matsuo ....................... 701/114

OTHER PUBLICATIONS

Hill, Geoffrey W., "Evaluation and Inversion of the Ratios of Modified Bessel Functions, $I_1(x)/I_0(x)$ and $I_{1.5}(x)/I_{0.5}(x)$", ACM Transactions on Mathematical Software, vol. 7, No. 2, Jun. 1981, pp. 199-208.

Ismailov, Murad M., "Dynamic Sonar Instantaneous Flow Meter (DISF) for Quantification of Diesel Multi-Burst Injection with High Temporal and Volumetric Resolution", SAE International, Paper No. 06P-510, 2005.

* cited by examiner

*Primary Examiner*—Harshad Patel
(74) *Attorney, Agent, or Firm*—Dobrusin & Thennisch PC

(57) ABSTRACT

The invention relates to a new method and a new apparatus to accurately measure flow rates in injection systems such as gasoline, direct injection gasoline and diesel downstream of the injector where the fuel (liquid in general) is discharged from a nozzle (e.g. an injector). More specifically, it measures the flow velocities and volumetric flow rates in highly transient flows discharged cyclically with injection duration within a few hundred microseconds. Moreover, it is able to resolve multiple injection shots produced within an engine cycle with high volumetric (0.01 mm3) and temporal (10 μs) sensitivities. The main uses of this instrument in automotive industry are manufactures of FIE, injection test machines and injection diagnostic systems. In other industries the uses maybe represented by measuring and controlling of highly transient flows with a need to accurately perform quantitative flow data in wide range of timing and dosing.

15 Claims, 1 Drawing Sheet

FLOW METER AND METHOD OF USING THE SAME

CLAIM OF PRIORITY

This application claims the benefit of U.S. provisional application No. 60/650,347, filed Feb. 4, 2005 and 60/767,224, filed Feb. 1, 2006, both of which are here by incorporated by reference.

FIELD OF THE INVENTION

The present invention relates to apparatuses and methods for measuring quantities of flowing fluids, and more particularly, to an improved flow meter and methods of using the flow meter.

BACKGROUND OF THE INVENTION

In the automotive field, fuel injection equipment (FIE) needs to be quantitatively tested in terms of timing of injection events and injection volume; sometimes called dosing. For diesel engines, the requirements of temporal resolution and dosing accuracy are increased because of multiple injections per cycle are used to increase fuel efficiency and to reduce emissions, especially soot and NOx.

Known FIE testing equipment is limited to injection volumes that range only over an order of magnitude; e.g. about 10 mm3 to about 100 mm3. Moreover, known FIE testing equipment lacks the resolution to distinguish between injection events that occur in diesel engines. Lastly, known FIE testing equipment is costly meaning that it may not be available to small companies, creating a barrier to entering the market of providing testing services.

The present invention overcomes one or more of these drawbacks.

SUMMARY OF THE INVENTION

The invention relates to a new method and a new apparatus to accurately measure flow rates in injection systems such as gasoline, direct injection gasoline and diesel downstream of the injector where the fuel (liquid in general) is discharged from a nozzle (e.g. an injector). More specifically, it measures the flow velocities and volumetric flow rates in highly transient flows discharged cyclically with injection duration within a few hundred microseconds. Moreover, it is able to resolve multiple injection shots produced within an engine cycle with high volumetric (0.01 mm3) and temporal (10 μs) sensitivities. The main uses of this instrument in automotive industry are manufactures of FIE, injection test machines and injection diagnostic systems. In other industries the uses maybe represented by measuring and controlling of highly transient flows with a need to accurately perform quantitative flow data in wide range of timing and dosing.

DETAILED DESCRIPTION

The present invention comprises a flow meter having at least one conduit through which a fluid can flow. The conduit generally has a circular cross-section, although other cross sections are also suitable (e.g. oval). The length of the conduit is not particularly critical, although lengths shorter than about 1 foot are preferred with a length of less about than 6 inches being most preferred. Although use of a single conduit is preferred, several conduits may be used in conjunction with each other to form a flow meter.

The flow meter of the present invention is suitable for analyzing a wide range of fluids, but finds a particular application in the automotive area, and in particular, for analyzing the flow of fuels. For example, fuel injectors for automotive engines may be connected to the flow meter to determine the amount of fuel emitted by the injector. The flow meter generally measures the propagation of the fluid down the conduit by detecting the fluid or a changing physical characteristic as each sensor (e.g. the pressure exerted by the fluid). Because of high pressure and short injection event like those common in fuel injectors, the pressure wave will be substantially flat, meaning that fluid near the center of the conduit is moving at nearly the same rate as fluid near the conduit wall.

Figure 1:
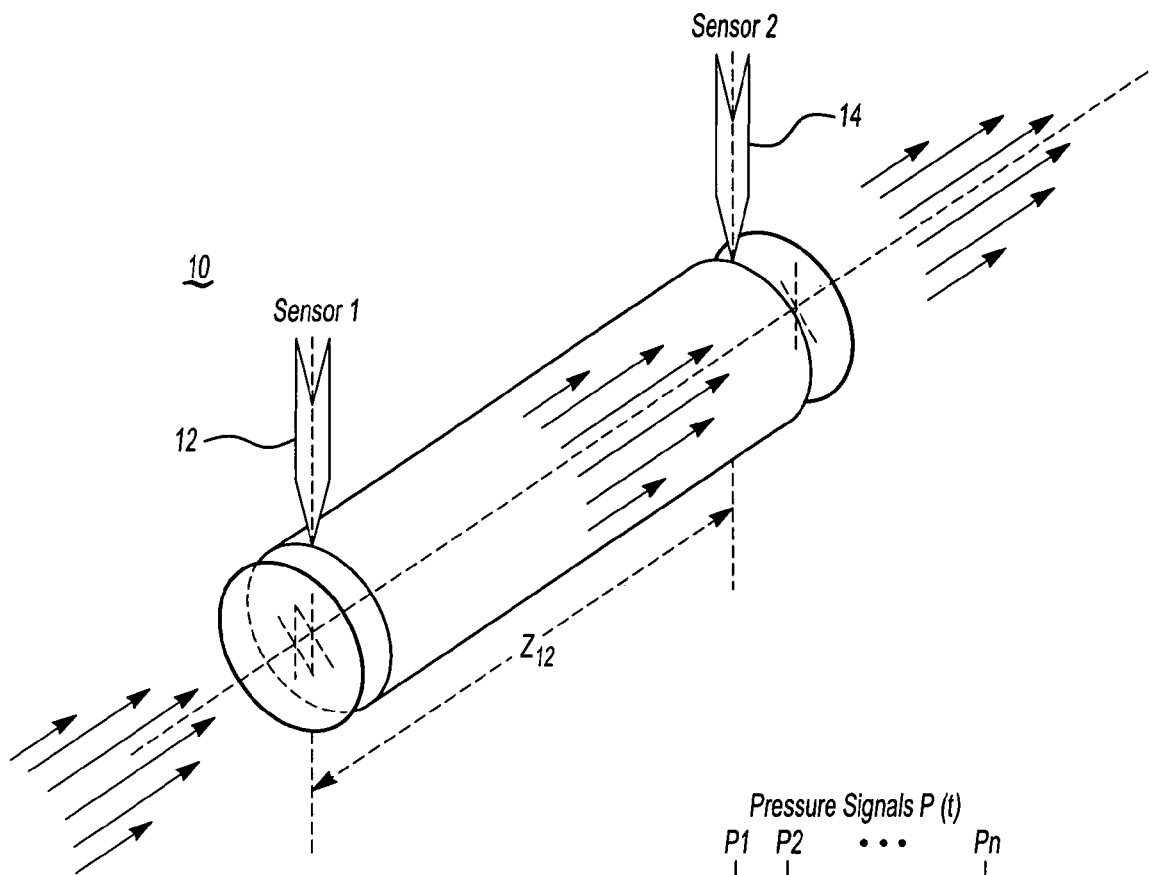
FIG. 1 depicts schematically one embodiment of a flow meter comprising two sensor sets, with each set have a pair of sensors.

Each conduit of the flow meter includes a measure section 10 as shown schematically in FIG. 1, comprising at least two sensors 12, 14 and preferably more sensors such as three, four, five or more sensors. The sensors are spaced from each other longitudinally along the length of the conduit. Any two sensors may be considered a sensor pair such as the first and second sensors in the conduit or the first and fourth, etc., with sensors numbered from upstream to downstream. Each sensor is designed to detect the presence of fluid in the conduit. Alternately, the sensor is used to detect a property of a fluid in the conduit that may indicate presence of the fluid in the conduit. For example, a pressure sensor may sense a change in fluid pressure or a temperature sensor may sense a change in temperature of the fluid. Preferably, a conduit comprises at least two pressure sensors. Sensors that have these functionalities may include sensors made by any suitable manufacturing technique (e.g. MEMS). Although not required, the sensors of a given sensor pair should be the same type e.g. both pressure sensors.

The sensors are placed so as not to obstruct in the fluid flow. For example, the sensors may be housed in the wall of the conduit with an opening to the conduit providing the sensor with access to the fluid. This arrangement of sensors provides no obstruction of the fluid flow by the sensor and thus minimal interference and more accurate measurements. In another embodiment, a housing is placed around the conduit as a support mechanism for the sensors, which are placed in the housing after an access hole has been made in the conduit. In one aspect the housing is adhesively bonded, clamped or both to the conduit.

Moreover, the sensors may also be angularly offset. The shift angle would be used to reduce or eliminate effects of micro-vortices that may be created in the flowing fluid due to interaction with upstream sensors. This feature is optional, and while a single offset angle is preferably selected for a conduit or flow meter, this is not necessarily the case.

In addition to the measurement section, the conduit further comprises an outlet down stream from the measurement section. The outlet comprises a variable orifice. The variable orifice permits the back pressure created by the flowing fluid to be adjusted. Back pressure is used to reduce turbulence in the conduit. The adjustment to the orifice may be manual (e.g. by the operator of the flow meter) or automatic (e.g. by a data processing unit of the flow meter).

In addition to the conduit, the flow meter further comprises an appropriately programmed data processing unit that receives signals from the sensor in the measurement section. The data processing unit may send signals to the sensors or the outlet to alter the functionality of these components.

The data processing unit may include a variety of functionalities including signal processing units, central processing units, data acquisition units, graphic processing units, memory, storage, output device (e.g. displays or printers), input devices (e.g. keyboards, mice, or the like), or the like and combinations thereof. Signal processing units may include the use of one or more filters (e.g. Kalman filters). The data processing unit may comprise a general purpose computer (e.g. a desktop or laptop), as these would have sufficient computing power to make any necessary calculations in a negligible amount of the time (e.g. less than about 10 sec).

The programming for the data processing unit includes instructions to carry out calculations using inputs from the sensors as discussed below. The flow velocity of the fluid at any sensor location can be calculated at any distance from the centerline of the conduit. Also, the volumetric flow rate across the cross section of the conduit can be calculated at any sensor location.

The flow meter discussed above is utilized to carry out the methods of the present invention including calculating the flow velocity and volumetric flow rate of an automotive fluid, and automotive fuels such as gasoline diesel, biodiesel, ethanol, and combinations thereof.

Calculating the flow velocity and flow rate comprise measuring the propagation of pressure wave through the conduit. The existence of the pressure wave, as well as the intensity of the pressure wave, is used as inputs for the calculations.

Calculating the velocity and flow rate comprises calculating a pressure gradient in the conduit and using the pressure gradient information as inputs for the velocity and flow rate calculation.

At least two methods exist for calculating the pressure gradient from the signals generated by the pressure sensors. In the direct method, the pressures exerted by the pressure wave are measured by two or more sensors. For two sensors, the pressure signals are converted to the pressure gradient signal by dividing the difference in the pressure signals by the distance between the sensors ($z_{12}$):

$$\frac{\delta P}{\delta z} \cong \frac{P_2(t) - P_1(t)}{z_{12}} \qquad \text{eq. 1}$$

In the time of flight method, the time it takes the pressure wave to travel from one sensor to the other is noted by the sensors to give time $\tau_{12}$. Time $\tau_{12}$ may be calculated using a spectral method, a time correlation method or the like. The speed of sound ($V_{sound}$) in the fluid is calculated by $z_{12}/\tau_{12}$. Using this information, for these and other sensors in the conduit, using only a single sensor, a pressure gradient can be calculated. A virtual displacement technique is used, meaning that a hypothetical second sensor is paired with each sensor, with the hypothetical sensor displaced from the first sensor by a distance d. Any distance d may be used; however, the smaller the distance, the more precise the calculation. The pressure gradient is calculated according to this equation:

$$\frac{\delta P}{\delta z} \cong \frac{P_i(t) - P_i\left(t - \frac{d}{V_{sound}}\right)}{d} \qquad \text{eq. 2}$$

Through this method a single sensor can be used to calculate the pressure gradient at any particular location within the conduit, thus increasing the number of data points, thus improving accuracy and resolution.

Spline and/or bandlimited interpolation techniques may be used to improve the resolution of the data and particularly the time data to increase the resolution and/or accuracy of either technique.

The pressure gradient spectra can be represented by it Fourier Series components, $K_n$:

$$\frac{\delta P}{\delta z} = \sum_{n=-\infty}^{\infty} K_n e^{i\omega_n t} \qquad \text{eq. 3}$$

From the pressure gradient information, the velocity and flow rate of the fluid in the conduit can be calculated. In particular, simplified Navier-Stokes equations are utilized to provide closed form, analytical solutions to the calculations of the flow velocity and flow rate. The time dependent flow velocity at any given distance from the centerline of the conduit is calculated by the following equation:

$$V(r,t) = \frac{K_0 R^2 (r^2 - 1)}{4\mu} + \sum_{n=1}^{\infty} \frac{K_n}{i\omega_n \rho}\left[\frac{J_0(\alpha_n i^{3/2} r)}{J_0(\alpha_n i^{3/2})} - 1\right] e^{i\omega_n t} + C.C. \qquad \text{eq. 4}$$

and the volumetric flow rate is calculated by the follow equation:

$$F(t) = -\frac{K_0 \pi R^4}{8\mu} + \sum_{n=1}^{\infty} \frac{K_n \pi R^2}{i\omega_n \rho}\left[\frac{2 J_1(\alpha_n i^{3/2})}{\alpha_n i^{3/2} J_0(\alpha_n i^{3/2})} - 1\right] e^{i\omega_n t} + C.C. \qquad \text{eq. 5}$$

wherein R is the radius of the conduit;

r is the normalized radius (0=centerline, and 1=R);

$\mu$ is the viscosity of the fluid ($\rho^* v$); $\rho$ is the density of the fluid;

$\alpha_n$ is the Taylor number $$R\sqrt{\frac{\omega_n}{v}};$$

$v$ is the kinetic viscosity of the fluid;

$J_0(\ )$ and $J_1(\ )$ are Bessel functions; and

C.C. are the complex conjugate terms.

These calculations are closed form solutions for the flow velocity and volumetric flow of the fluid that do not require iteration.

The results calculated by the above equations may be further processed to improve their accuracy, resolution or to improve the speed of processing. Processing speed may be increased by simplifying the Bessel function ratios, such as those that appear in the volumetric flow rate equation. For Bessel function ratios such as $$\frac{J_1(i^{3/2}x)}{J_0(i^{3/2}x)},$$

as values of become larger, the numerator and denominator head toward infinity while the ratio remains stable. A numerical method of dealing with a related problem has been suggested in "Evaluation and inversion of the Ratios of Modified Bessel Function" by Geoffery Hill, ACM Transaction on Mathematical Software, Vol. 7, No. 2, June 1981, Pages 199-208, hereby incorporated by reference. The relationship between modified Bessel functions and Bessel functions is as follows: $I_n(x)=i^{-n}J_n(ix)$. Thus, using the suggested fraction expansion substituted with the Bessel function (instead of the modified Bessel functions) leads to the following equation:

$$\frac{J_1(i^{3/2}x)}{J_0(i^{3/2}x)} = i\left(1 - \cfrac{2}{4y-1-\cfrac{1}{4y/3-2-\cfrac{1}{4y/5-2-\cfrac{1}{4y/7-\ldots}}}}\right) \quad \text{eq. 6}$$

where $y = i^{1/2}x$

Calculating this to only a few terms (e.g. about 2 to about 10) of the expansion provides excellent accuracy for the Bessel function ratios in a manner that is rapidly calculated. This also speeds the calculation of the volumetric flow rate.

Figure 2:
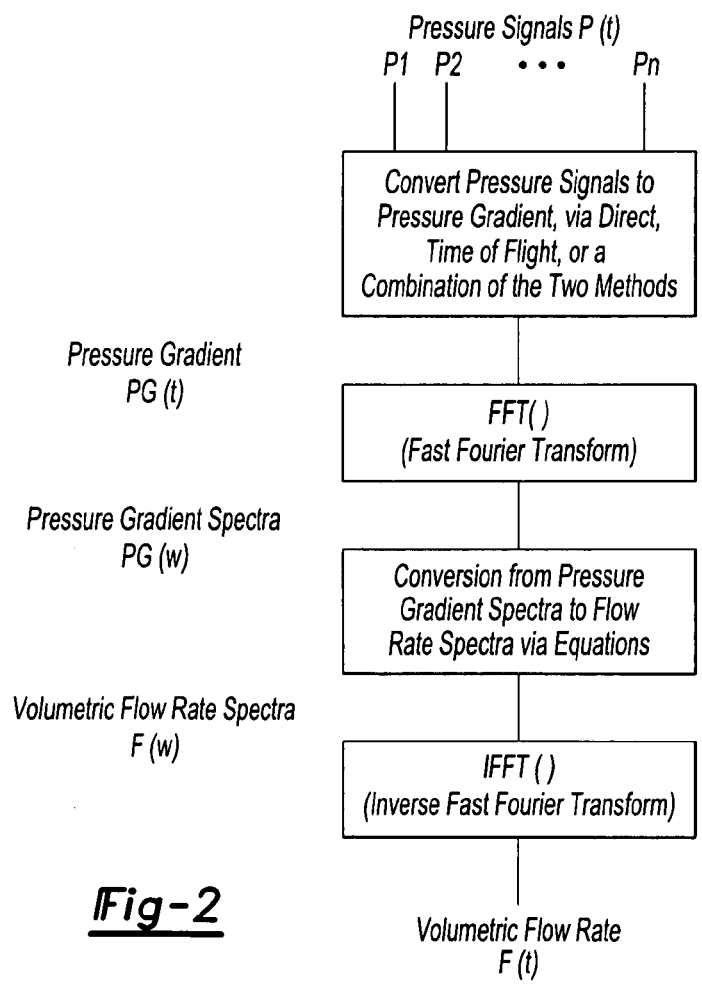
FIG. 2 depicts a flow chart of the method of one embodiment of the invention.

As seen in FIG. 2, in one embodiment of the method comprises calculating the pressure gradient from the pressure signals via the direct method, the time of flight method or a combination thereof. From the pressure gradients, pressure gradient spectra are calculated using fast Fourier transform. The pressure gradient spectra are used as inputs for equation 5 to obtain spectra for the volumetric flow rate. Inverse fast Fourier transform is used to obtain the flow velocity and volumetric flow rate. A similar method is used to achieve the flow velocity.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A flow meter, comprising:
   a conduit comprising at least two pressure sensors longitudinally spaced from each other in the conduit and being located downstream from a fuel injector, the at least two pressure sensors measuring pressure of a discharged fluid from the fuel injector; and
   a data processing unit connected to the pressure sensors to receive signals from the pressure sensors based upon the discharged fluid, wherein the data processing unit is programmed to calculate a pressure gradient from the signals received from the pressure sensors and further programmed to calculate one or more of flow velocity or volumetric flow rate of the discharged fluid in the conduit using a non-iterative calculation.

2. The flow meter of claim 1 wherein the at least two pressure sensors are placed so as not to obstruct fluid flow in the conduit.

3. The flow meter of claim 2 wherein the at least two pressure sensors are placed in the wall of the conduit.

4. The flow meter of claim 2 wherein the at least two pressure sensors are placed in one or more housing on the conduit.

5. The flow meter of claim 2 wherein the at least two pressure sensors are angularly offset from one another.

6. The flow meter of claim 5 further comprising a variable outlet.

7. A method of metering a flowing fluid, comprising:
   providing a fluid discharge device for discharging a liquid fluid;
   discharging the liquid fluid in a conduit having at least two pressure sensors to generate pressure sensor outputs;
   calculating one or more pressure gradients from the pressure sensors outputs;
   calculating one or more flow velocities or volumetric flow rates from the pressure gradients using a closed form solution.

8. The method of claim 7 wherein the flow velocity or volumetric flow rate calculation is non-iterative.

9. The method of claim 8 further comprising interpolating the pressure sensor outputs before calculating the one or more pressure gradients.

10. The method of claim 7 wherein calculating the one or more pressure gradients comprises utilizing the direct method, the time of flight method or a combination thereof.

11. The method of claim 10 wherein calculating the flow velocity is calculated according to equation 4.

12. The method of claim 11 wherein calculating the volumetric flow rate is calculated according to equation 5.

13. The method of claim 7 wherein calculating one or more volumetric flow rates comprises using equation 6.

14. The method of claim 7 wherein the at least two pressure sensors are angularly offset.

15. The method of claim 14 wherein the pressure sensors do not obstruct the flow of fluid in the conduit.

* * * * *